March 24, 1925.
W. C. STILSON ET AL
ANIMAL TRAP
Filed April 30, 1923
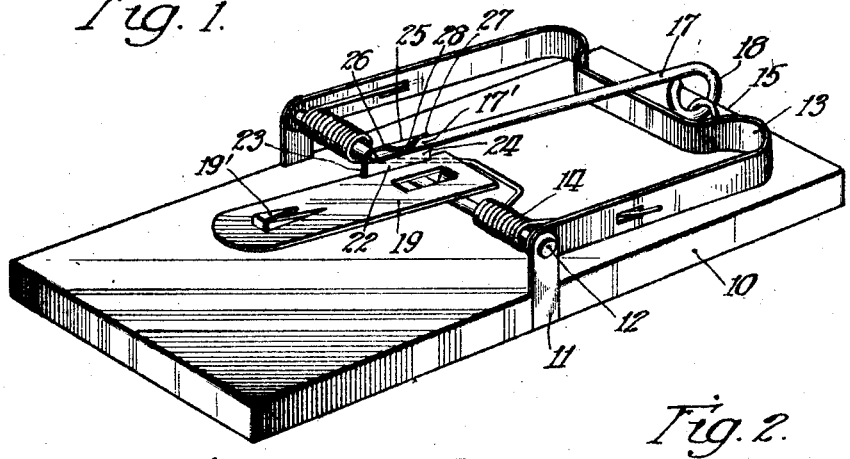
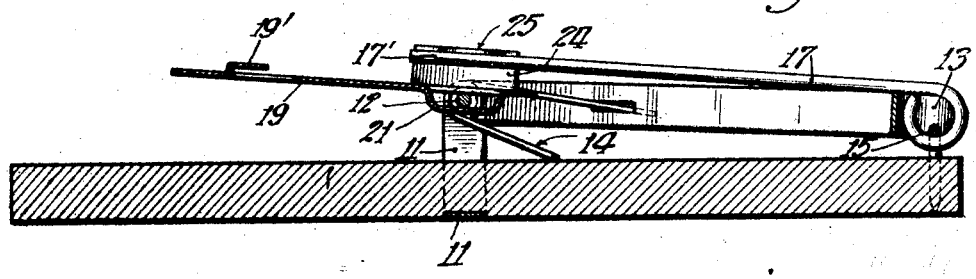
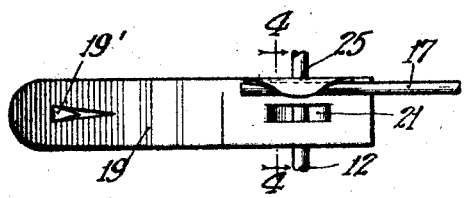
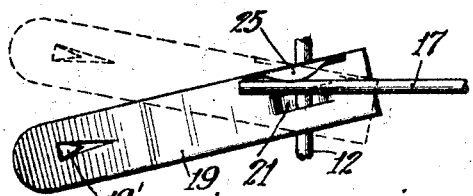
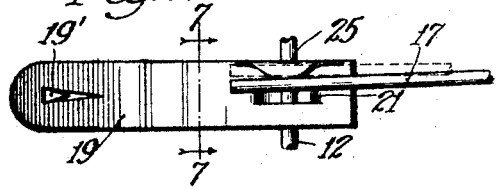
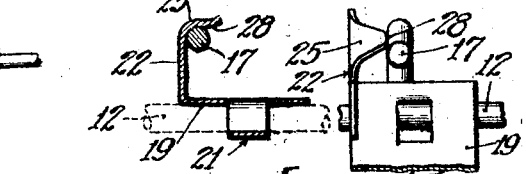
Inventors:
Will C. Stilson.
Herbert A. Stilson
By: George E. Mueller Atty.

Patented Mar. 24, 1925.

1,530,918

UNITED STATES PATENT OFFICE.

WILL C. STILSON, OF MORRISON, AND HERBERT A. STILSON, OF CHICAGO, ILLINOIS.

ANIMAL TRAP.

Application filed April 30, 1923. Serial No. 635,556.

*To all whom it may concern:*

Be it known that we, WILL C. STILSON and HERBERT A. STILSON, citizens of the United States, residing at Morrison and Chicago, respectively, in the counties of Whiteside and Cook, respectively, and State of Illinois, have invented a certain new and useful Improvement in Animal Traps, of which the following is a full, clear, concise, and exact description, reference being had to the accompanying drawings, forming a part of this specification.

Our invention relates to improvements in animal traps, and has for its general object to provide in the latching mechanism by which the trap is set, a four-way-release trigger, arranged to free the trap for operation when the baited portion of the trigger is moved in any direction transverse to its length—that is to say, up or down, or toward either side.

Another object of our invention is to provide a structure that may be set with greatest ease, will hold the parts set with such precision as to make accidental release impossible, and will "spring" or "trip" the trap easily and reliably under intended conditions of operation.

In animal traps, and more particularly rat and mouse traps, of many specific constructions, it is common to provide a primary imprisoning—or killing—element, usually spring-impelled in action; a restraining element to hold the primary element in set position arranged itself to be put under tension by the spring tension on the primary element; and a trigger member cooperating with the restraining element to latch it in set position so that a predetermined operation of the trigger element will unlatch the restraining element and free the killing or imprisoning element for operation. We have herein shown our invention as embodied in the pivoted-yoke-type of trap, of the foregoing general description, wherein the killing element is a yoke pivotally mounted on a base, spring urged in one direction, and restrained, when the trap is set, by a restraining arm that has a loop-and-staple pivotal connection with the base, and that, at its free end, cooperates with a pivoted latch element, which at its free end carries the bait. This form of trap (and other forms in which our invention may be embodied) is common in the art and generically we lay no claim thereto.

In the preferred embodiment of our invention we provide an inter-relation of the restraining element and the trigger such that movement of the pivoted trigger from latching position in any direction transverse to its length effects a relative displacement of parts of the trigger-element and restraining-element such as to cam the parts to unlatching position, thereby to trip the restraining element and free the killing or imprisoning member.

In the drawings, wherein we have illustrated a single embodiment of our invention for purposes of disclosure—

Fig. 1 is a perspective view of a trap embodying our invention;

Fig. 2 is a vertical longitudinal section therethrough;

Fig. 3 is a fragmentary view illustrating the restraining arm and trigger in latching or set position;

Fig. 4 is a section on line 4—4 of Fig. 3;

Fig. 5 is a diagram illustrating the release operation as effected by lateral displacement of the trigger;

Fig. 6 is a plan diagram illustrating the releasing operation as effectied by the vertical displacement of the trigger; and Fig. 7 shows an enlarged sectional view taken on line 7—7 of Fig. 6 with the trigger tilted down and the latch cammed out from engagement therewith.

In the specific form of construction shown the base 10, the pintle-carrying ears 11, the pintle 12, the killing-yoke 13, the pintle-surrounding yoke-spring 14, staple 15, and the elongated restraining arm 17, which has a loop 18 engaging the staple, may all be of usual and well known construction and relative disposition. As illustrated in the drawings, the loosely pivoted restraining arm 17 has its free end 17' capable of universal displacement and reaches forward over the transverse pintle 12 on which, conveniently, the trigger may be mounted between the coils of the yoke-spring 14.

The trigger 19 has its bait-carrying end 19' extending into suitable proximity to the position occupied by the killing element when sprung, and its mounting is such that said bait-end, or tripping-end is free for both vertical and lateral displacement. Engaging portions of the trigger member and the restraining element are arranged to coact to latch the restraining element in set position where it will retain the killing yoke with its spring under tension, such engagement bringing into predetermined alignment certain cam surfaces of the interengaging parts so that said cams are ineffective to prevent latching, but in such fashion that displacement of the bait carrying end of the trigger in any of four directions, (up or down or either way, transversely) will destroy the predetermined alignment, bringing an appropriate one of the cam surfaces into play to force a change in relation between the coacting restraining arm and trigger parts that frees the restraining member from the latch engagement and thereby releases the killing yoke. Such construction and mode of operation we believe to be broadly new.

In the particular construction shown for purposes of disclosure of a single embodiment of this invention in a practical and satisfactory commercial structure, the trigger lever 19 is a light metal strip having a bait-hook and having an integral portion 21 thereof slit loose at its sides and depressed to provide an elongated strap embracing the pintle 12, as one convenient way of providing for both vertical and lateral displacement of the baited end of the lever. At one side, above the pintle 12, the lever carries an upturned plate 22, with its ends 23 and 24 lying on opposite sides of the pintle, said plate bearing an inturned latch lip 25, the free edge of which is cam-curved, as at 26 and 27 and the crest-curve 28 of which may be sloped upwardly or beveled on its under side. When the bait receiving end of the lever 19 is either raised or lowered the appropriate one of these cam surfaces 26 or 27 receives the up-thrust of the restraining arm and since the slope is too gradual to hold the arm 17, the restraining arm is displaced laterally and springs the trap; and when the trigger-lever has its bait receiving end displaced laterally the appropriate surface 23 or 24 of the plate acts to cam over the restraining arm so that it escapes from crest 28 to free the restraining arm.

In operation the trap is set as shown in Fig. 1. This operation is particularly easy for it is only necessary to pull back the yoke 13, overlay its cross-piece with the restraining arm 17, and press laterally the tip of the restraining arm firmly against the plate 22. The tip of the restraining arm will bring the plate into alignment with said arm, and when the tip of the restraining arm is allowed to rise under the latch lip 25, it automatically brings the lip into horizontal alignment with the restraining arm, elevating the bait-carrying end of the lever to a proper degree, and thus placing the restraining arm and trigger lever in predetermined alignment, as shown in plan in Fig. 3, in which position the trigger lever latches the restraining arm with ample security to maintain the trap in set condition. The trap may easily be set in the dark without the least danger of injuring the operator.

The releasing operations are diagrammatically illustrated in Figs. 5 to 7. It will be manifest that if the bait lever be swung to the right or to the left, then the surface 23 or the surface 24, respectively, of the plate will cam the restraining arm laterally from under the lip 23 as shown in plan in Fig. 5. If the trigger be depressed or elevated, the tilting of the lip from its horizontal position will cause the cam surface 26 or 27, respectively, to engage the restraining arm, so that under the thrust of the spring impelled yoke, said restraining arm slips off of the curved cam surface, springing the trap.

What we claim as new and desire to secure by United States Leters Patent is:

1. In a trap, a restrainable element, a restraining arm therefor, and a trigger for said arm, said trigger consisting of a lever mounted for transverse and vertical displacement of its free end; said arm and trigger providing coacting surfaces engageable to latch the arm when in predetermined relation and cam surfaces on the trigger disposed to be brought into play by movement of the free end of the lever transversely to its length relatively to displace the parts to free the arm from latching engagement.

2. In a trap, a spring-urged primary element, a restraining arm therefor, and an arm-latching trigger pivoted for four-way displacement of its end and providing a surface for coaction with the arm to latch it with the parts in predetermined alignment and with cam surfaces disposed to act on the arm, when the trigger-end is moved in any of its four directions, positively to force the parts out of said alignment to free the arm.

3. In a trap, a spring-urged primary element, a restraining arm therefor, and an arm latching trigger, pivoted for vertical movement of its free end and providing surfaces for coaction with the arm to latch it with the parts in predetermined alignment and with cam surfaces disposed to act on the arm when the trigger end is moved up or down, positively to force the parts out of said alignment to free the arm.

4. In a trap, a spring-urged primary element, a restraining arm therefor, an arm latching trigger, pivoted for movement of its free end, and an upstanding projection on said trigger having its upper end portion deflected to one side thereof transversely of the trigger to overlie the said arm from one side thereof and latch it in predetermined alignment when the trigger is in set position, said projection and deflected portion being disposed to act on the arm when the trigger is moved from its set position positively to force the parts out of said alignment to free the arm.

5. In a trap, the combination of a spring-urged primary element, a restraining arm therefor, an arm latching trigger pivoted for universal movement of its free end, and a wing extending upwardly from a side of the trigger and having a lip projecting from its upper end to one side thereof, the projecting edge of the lip being convexly curved longitudinally of the trigger to engage and retain the restraining arm when in set position, and positively move the same out of alignment with the lip when the free end of the trigger is moved from its set position.

6. In a trap, the combination of a spring-urged primary element, a restraining arm therefor, an arm latching trigger pivoted for universal movement of its free end, and a flat wing extending upwardly from the trigger with its flat surface disposed longitudinally of the trigger and having a lip projecting from its upper end to one side thereof, the projecting edge of the lip being convexly curved longitudinally of the trigger to engage and retain the restraining arm when in set position, and positively move the same out of engagement with the lip when the free end of the trigger is moved from its set position.

7. In a trap, the combination of a spring operated element, a restraining arm therefor, and latching means, said latching means including a lever pivotally mounted with a free bait end movable in any direction transverse to its longitudinal axis and a member rigidly connected with said lever arranged to hold said arm in predetermined position having cam surfaces to move the arm to release the latter when the bait end lever is moved in any such transverse direction.

8. In a trap, the combination of a spring operated element, a restraining arm therefor, and a latching means, said latching means including a pivotally mounted universally movable lever member having a rigidly attached extension under which said arm is arranged to be held in predetermined position and having a cam surface coacting with the arm to release the latter when the lever is moved in any direction transverse to its longitudinal axis.

9. In a trap, the combination of a spring operated element, a restraining arm therefor, and a latching means, said latching means including a member having a wall and an extension having a cam surface, the arm being arranged under the extension to hold the arm in predetermined position, the wall and cam surface of the extension cooperating with the arm to move the arm to one side to release the latter when the latching means is moved.

In witness whereof we hereunto subscribe our names this 26th day of March A. D., 1923.

WILL C. STILSON.
HERBERT A. STILSON.